N. I. ALLEN.
Loom Weft-Forks.

No. 156,403. Patented Nov. 3, 1874.

Witnesses

Nicholas I. Allen.
by his attorney

UNITED STATES PATENT OFFICE.

NICHOLAS I. ALLEN, OF HOPEDALE, MASSACHUSETTS, ASSIGNOR TO GEORGE DRAPER & SON, OF SAME PLACE.

IMPROVEMENT IN LOOM WEFT-FORKS.

Specification forming part of Letters Patent No. 156,403, dated November 3, 1874; application filed October 14, 1874.

*To all whom it may concern:*

Be it known that I, NICHOLAS I. ALLEN, of Hopedale, of the county of Worcester and State of Massachusetts, have invented a new and useful Improvement in Stop-Motion Forks for Looms; and do hereby declare the same to be fully described in the following specification and represented in the accompanying drawings, of which—

Figure 1:
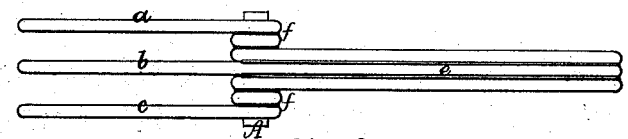
Figure 2:
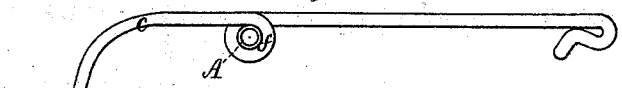
Figure 4:
Figure 3:
Figure 5:
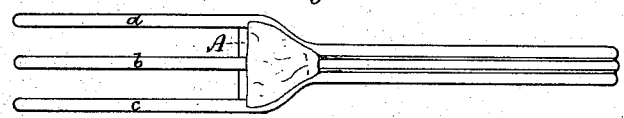

Figure 1 denotes a top view, Fig. 2 a side view, Fig. 3 a bottom view, and Fig. 4 a transverse section, of a filling-fork with my improvement. Fig. 5 is a top view, and Fig. 6 a side view, of another such fork with my addition and the fork somewhat differently constructed.

My invention consists in the combination of a pivotal bridge with the outer and middle tines of the fork, such bridge being extended across and secured to them, in order to give support to them, and particularly to the middle tine, so as to prevent it, or it and its shank, while in use, from breaking or being broken away or separated from the flanking tines and their shanks.

The invention has reference to stop-motion filling-forks made of wire, essentially as represented in the United States Patent No. 139,251, dated May 27, 1873, and granted to Jacob H. Knowles.

In the drawings, the fork is represented as having three tines or prongs, $a\ b\ c$, and with the shank portion $e$ of the middle prong $b$ without any pivotal helix, especially when between the pivotal helices $f\ f$ of the other prongs, as shown in Figs. 1, 2, and 3. The shanks of the prongs are soldered together.

The pivotal bridge is exhibited at A, it, as represented in Figs. 1, 2, 3, 4, being a short metallic tube extended through the helices of the outer prongs, the middle prong or the shank thereof resting directly upon such tube at its middle, the bridge being soldered to the helices, and the middle prong or its shank.

It will be seen that the tube, while supported by the helices, stays and supports the middle prong or its shank, and, besides, gives support and connection to helices.

Figure 6:
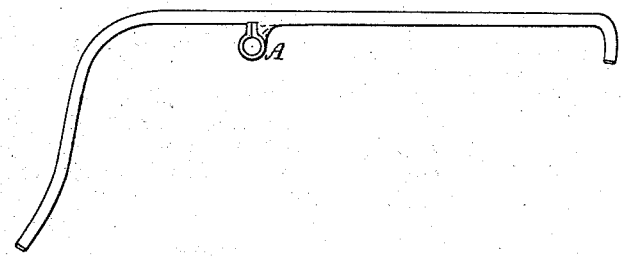

In Figs. 5 and 6 the tubular bridge A is represented as arranged below and against all the prongs, neither of which, as shown, has a pivotal helix, the tube being secured to the several prongs by solder run between it and them, and also between them.

The tubular pivotal bridge applied to and combined with the wire filling-fork adds very materially to its strength and durability, besides being useful in other respects.

I do not claim a stop-motion filling-fork constructed of wire, as represented in either of the United States Patents No. 114,307, dated May 2, 1871, and No. 139,251, dated May 27, 1873.

What I claim as my invention is as follows, viz:

In combination with the wire filling-fork, as described, the tubular bridge A, arranged with or applied to its tines $a\ b\ c$, and their compound shank, all substantially as specified.

NICHOLAS I. ALLEN.

Witnesses:
E. D. BANCROFT,
FRANK J. DUTCHER.